United States Patent Office 3,636,006
Patented Jan. 18, 1972

3,636,006
WATER-INSOLUBLE ANTHRAQUINONE DERIVATIVES
Jean-Frederick Guye-Vuilleme and Otto Ruettner, Basel, Switzerland, assignors to Ciba Limited, Basel, Switzerland
No Drawing. Filed Oct. 2, 1967, Ser. No. 671,943
Claims priority, application Switzerland, Oct. 10, 1966, 14,576/66; Oct. 18, 1966, 14,999/66; Jan. 25, 1967, 1,070/67
Int. Cl. C09b 1/50; C07c 121/78
U.S. Cl. 260—378         6 Claims

ABSTRACT OF THE DISCLOSURE

Aminoanthraquinone derivatives containing a N-cyanomethylamino group and process for their preparation.

The present invention is based on the observation that valuable anthraquinone derivatives may be obtained when anthraquinoid compounds which contain at least one secondary or preferably a primary amino group in a benzene ring fused to the quinoid ring are treated in a manner such that the said amino group or groups is/are converted by methods known per se into cyanomethylamino groups, in which the methyl residues may contain further substituents bound to the carbon atom, for example, alkyl, aralkyl, aryl or cycloalkyl residues, or in which the alkyl residues may form part of a carbocyclic or heterocyclic ring. The most important derivatives are those of 9,10-dioxoanthracene which preferably contain an amino group in periposition, that is to say, in 1-, 4-, 5- or 8-position. The following, for example, may be mentioned: 1-aminoanthraquinone, 1-amino-4-hydroxyanthraquinone, 1,4 - diaminoanthraquinone, 1,5-diaminoanthraquinone, 1,4,5,8-tetra-aminoanthraquinone and 2-aminoanthraquinone, aminoanthraquinones which contain further substituents, especially hydroxyl groups, for example, 1,5-diamino-4,8-dihydroxyanthraquinone and the halogenation products thereof, especially the monobromo and dibromo derivatives thereof, and especially those of the formula

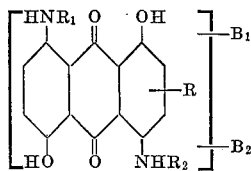

in which $R_1$ and $R_2$ each represents a hydrogen atom or an alkyl residue that may be substituted, for example, by hydroxy, alkoxy, acyloxy or aryl groups, $B_1$ and $B_2$ each represents an alkyl residue that may be substituted, a halogen atom or especially a hydrogen atom and R represents an aryl residue which is preferably substituted, especially a benzene residue which contains at least one acyloxy, aryloxy, hydroxy or alkoxy group in ortho- or para-position to the anthraquinone residue, or a fused heterocyclic five-membered or six-membered ring which is bound at para-position through a sulphur atom or an oxygen atom.

The following dihydroxydiaminoanthraquinones may be mentioned as examples:

1,5-dihydroxy-4,8-diamino-2-(4'-hydroxyphenyl)-hydroxyphenyl-anthraquinone,
1,5-dihyroxy-4,8-diamino-2-(4'-hydroxy-3'-chlorophenyl)-anthraquinone,
1,5-dihydroxy-4,8-diamino-2- or
3-(4'-methoxyphenyl)-anthraquinone,
1,5-dihydroxy-4,8-diamino-2- or
3-(4'-hydroxy-3'-methylphenyl)-anthraquinone,
1,5-dihydroxy-4,8-diamino-2- or
3-(4'-hydroxy-2'-methylphenyl)-anthraquinone,
1,5-dihydroxy-4,8-diamino-2- or
3-(2'-hydroxy-5'-methylphenyl)-anthraquinone,
1,5-dihydroxy-4,8-diamino-2- or
3-(2'-hydroxy-5'-ethylphenyl)-anthraquinone,
1,5-dihydroxy-4,8-diamino-2- or
3-(4'-hydroxy-amylphenyl)-anthraquinone,
1,5-dihydroxy-4,8-diamino-2- or
3-(2'-hydroxy-5'-amylphenyl)-anthraquinone,
1,5-dihydroxy-4,8-diamino-2- or
3-(2'-hydroxy-5'-octylphenyl)-anthraquinone,
1,5-dihydroxy-4,8-diamino-2- or
3-(2'-hydroxy-5'-cyclohexylphenyl)-anthraquinone,
1,5-dihydroxy-4,8-diamino-2- or
3-(4'-hydroxy-3'-phenylphenyl)-anthraquinone,
1,5-dihydroxy-4,8-diamino-2- or
3-(2'-hydroxy-5'-phenylphenyl)-anthraquinone,
1,5-dihydroxy-4,8-diamino-2- or
3-("-hydroxy-3',5'-dimethylphenyl)-anthraquinone,
1,5-dihydroxy-4,8-diamino-2- or
3-(3',4'-dimethoxyphenyl)-anthraquinone,
1,5-dihydroxy-4,8-diamino-2- or
3-(2',5'-dimethoxyphenyl)-anthraquinone,
1,5-dihydroxy-4,8-diamino-2- or
3-(4'-benzyloxyphenyl)-anthraquinone,
1,5-dihydroxy-4,8-diamino-2- or
3-(4'-hydroxy-3'-methoxyphenyl)-anthraquinone,
1,5-dihydroxy-4,8-diamino-2- or
3-(3'4'-dihydroxyphenyl)-anthraquinone,
1,5-dihydroxy-4,8-diamino-2- or
3-(2',4'-dihydroxyphenyl)-anthraquinone,
1,5-dihyroxy-4,8-diamino-2- or
3-(2',5'-dihydroxyphenyl)-anthraquinone,
1,5-dihydroxy-4,8-diamino-2 or
3-(2',4',6'-trihydroxyphenyl)-anthraquinone,
1,5-dihydroxy-4,8-diamino-2- or
3-(4'-phenoxyphenyl)-anthraquinone,
1,5-dihydroxy-4,8-diamino-2- or
3-(2'-hydroxynaphthyl-1')-anthraquinone,
1,5-dihydroxy-4,8-diamino-2- or
3-(4'-hydroxynaphthyl-1')-anthraquinone,
1,5-dihydroxy-4-amino-8-methylamino-2- or
3-(4'-hydroxyphenyl)-anthraquinone,
1,5-dihydroxy-4,8-dimethylamino-2- or
3-(4'-hydroxyphenyl)-anthraquinone,
1,5-dihydroxy-4-amino-8-hydroxyethylamino-2- or
3-(4'-hydroxyphenyl)anthraquinone,
1,5-dihydroxy-4-amino-8-acetoxyethylamino-2- or
3-(4'-methoxyphenyl)-anthraquinone,
1,5-dihydroxy-4-amino-8-benzoyloxyethylamino-2- or
3-(4'-hydroxyphenyl)-anthraquinone,
1,5-dihydroxy-4,8-diamino-6-
(or 7)-bromo-2- or
3-(4'-hydroxyphenyl)-anthraquinone,
1,5-dihydroxy-4,8-diamino-6-
(or 7)-bromo-2- or
3-(4'-methoxyphenyl)-anthraquinone,
1,5-dihydroxy-4,8-diamino-2- or
3-(4'-hydroxy-3'-[or 2']-bromophenyl)-anthraquinone,
1,5-dihydroxy-4,8-diamino-2- or
3-(4'-methoxy-3'-[or 2']-bromophenyl)-anthraquinone,
1,5-dihyroxy-4,8-diamino-6- (or 7)-bromo-2- or
3-(4'-methoxy-3'-[or 2']-bromophenyl)anthraquinone,
and also 1,5-dihydroxy-4,8-diamino-anthraquinones which contain in 2- or 3-position the residue of a 2,3-dihydrobenzthiophene, 2,2-dimethyl-3-hydrobenzofuran, 2-methyl-2, 3-dihydrobenzofuran, 2,5- or 2,7-dimethyl-2,3-dihydrobenzofuran or 2-methyl-7-chloro-2, dihydrobenzofuran bound in 5-position, or the residue of a 2,2,3- or 2,2,4-trimethylchroman, 2,2,4-trimethyl-3,4-dehydrochroman or 2,3-benz-1,4- or -1,5-dioxane bound in 6-position.

These compounds may be obtained, for example, by addition of hydroxy- or alkoxy-benzenes to boric acid esters of 1,5-dihydroxy-4,8-diaminoanthraquinone-2,6-disulphonic acid dissolved in concentrated sulphuric acid in accordance with German patent specification No. 445,269, boiling the addition product in an acidic aqueous solution or heating it in an alkaline solution to 20 to 60° C., whereby a sulphonic acid group is split off, according to German patent specification No. 446,563, and splitting off the sulphonic acid group still present, and, if necessary, treating the 1,5 - dihydroxy - 4,8-diamino-2-phenyl-anthraquinones so obtained with alkylating and/or acylating agents, for example, ethyl bromide, ethyl chloride, ethylene chlorohydrin and benzyl chloride, as well as alkylsulphonic acid esters, for example, para-toluenesulphonic acid methyl ester; alkyl sulphates, for example, dimethyl sulphate or diethyl sulphate; aldehydes, especially formaldehyde; alkylene oxides, for example, ethylene oxide; chloroformic acid chloroethyl ester, chloroformic acid-$\beta$-chloroisopropyl ester, chloroformic acid-1-phenyl-2-chloroacetyl ester or epichlorohydrin, acetic anhydride or benzoyl chloride. Compounds in which the aryl residue is bound in 3-position may be obtained by the process described in Belgian patent specification No. 627,010.

Alkylation or acylation is advantageously effected by heating in an inert organic solvent, for example, a halogenated hydrocarbon, for example, chlorobenzene or ortho-dichlorobenzene, a nitro-hydrocarbon, for example, nitrobenzene or a nitronaphthalene, a hydroxybenzene, for example, phenol or a cresol, an acid amide, for example, dimethylformamide or N-methyl - pyrrolidone, or also dimethyl sulphoxide or pyridine. It is advantageous to use an agent capable of binding acid, for example, an alkali metal carbonate, when carrying out alkylation with an alkyl halide.

Conversion of the amino groups into cyanomethyl groups is effected by known methods, preferably by reaction with an aldehyde or a ketone and hydrocyanic acid or a salt thereof. Suitable aldehydes are, for example, acetaldehyde, propionaldehyde and especially benzaldehyde, but above all, paraformaldehyde; suitable ketones are, for example, acetone, ethyl methyl ketone, cyclopentanone or especially cyclohexanone. It is advantageous to carry out the reaction with potassium cyanide in glacial acetic acid and when using amines which are weakly basic, the acidity of the medium can be raised by the addition, for example, of anhydrous zinc chloride, concentrated sulphuric acid or boron trifluoride/acetic acid to the glacial acetic acid, thereby accelerating the reaction. The reaction may be carried out at room temperature, but preferably at a slightly elevated temperature, for example, at 40 to 60° C.

The new cyanomethylated aminoanthraquinone compounds or mixtures thereof are valuable products which may be used, for example, as dyestuffs or as dyestuff intermediates. When used as dyestuffs they are suitable for dyeing a very wide variety of materials. Those products which are insoluble in organic solvents and water may be used as pigments. Those that are soluble in organic solvents, for example, esters and especially ethanol and in acetone, may be used for colouring natural or synthetic resins, waxes, lacquers and plastics compositions, for example, those made from cellulose ethers or cellulose esters: for example, they may be used in the spin colouration of cellulose acetate rayon and for the colouration of natural or synthetic polymers or condensation products. In particular, they display excellent affinity for polyester fibres, especially polyethylene terephthalate fibres, and dye these fibres pure blue to greenish blue shades possessing excellent fastness to light and sublimation. Furthermore, the new dyestuffs possess good building-up properties and reserve well on cotton.

The following examples illustrate the invention. Unless otherwise stated, the parts and percentages are by weight.

EXAMPLE 1

4.46 parts of finely powdered 1-aminoanthraquinone, 1.8 parts of paraformaldehyde, 3.9 parts of potassium cyanide and 9.9 parts of zinc chloride are introduced into a flask provided with a stirrer. 100 parts by volume of glacial acetic acid containing a few drops of sulphuric acid are added dropwise within one hour while stirring and cooling the flask externally. The batch is then heated to 50° C. and kept at 50 to 60° C. for 10 hours. The batch is then cooled, diluted with water, stirred for a short period, filtered, and the filter residue is washed with warm water. 5 parts of an orange-yellow product melting at 224 to 228° C. are obtained. When recrystallized from ortho-dichlorobenzene, the chromatographically pure 1-cyanomethylaminoanthraquinone melts at 230 to 231° C.

By using instead of 1-aminoanthraquinone corresponding amounts of 1-amino-4-hydroxyanthraquinone,
1,4-diaminoanthraquinone,
1,5-diaminoanthraquinone,
1,4,5,8-tetra-aminoanthraquinone,
1,4-diamino-2-methoxyanthraquinone,
1,4-di-(N-methyl)-amino-5-amino-8-hydroxyanthraquinone,
1-amino-2-$\beta$-hydroxyethoxy-4-hydroxyanthraquinone or
1-amino-2-methoxyanthraquinone-4-para-toluenesulphonamidoanthraquinone, but otherwise proceeding in the manner described above, the corresponding anthraquinone compounds are obtained in which the amino group or groups is/are replaced wholly or in part by 1-cyanomethylamino groups.

1-$\alpha$-cyanoethylaminoanthraquinone is obtained by replacing the paraformaldehyde with the corresponding amount of acetaldehyde and otherwise proceeding in the manner described above.

The analogous compounds are obtained by replacing the zinc chloride (and a few drops of sulphuric acid) with 5.9 parts of concentrated sulphuric acid and proceeding in the manner described above.

EXAMPLE 2

4.46 parts of 1-aminoanthraquinone, 1.8 parts of paraformaldehyde, 3.9 parts of potassium cyanide, 9.9 parts of zinc chloride together with 5 parts of dimethylformamide are introduced into a round-bottomed flask and the procedure described in Example 1 is followed. 1-cyanomethylaminoanthraquinone is also obtained in a good yield.

EXAMPLE 3

4.46 parts of finely powdered 2-aminoanthraquinone, 1.8 parts of paraformaldehyde, 3.9 parts of potassium cyanide and 20.8 parts of zinc chloride are introduced into a flask provided with a stirrer. A mixture of 50 parts by volume of glacial acetic acid and a few drops of sulphuric acid is added dropwise within one hour with stirring and external cooling. The batch is then heated to 55° C. and kept at 55 to 60° C. for 10 hours. It is worked up in the manner described in Example 1. 5.2 parts of the yellow 2-cyanomethylaminoanthraquinone are obtained.

By the same procedure, corresponding amounts of 1,5-dihydroxy - 4,8 - diaminoanthraquinone or 1,8-dihydroxy-4,5-diaminoanthraquinone can be converted into the corresponding dimonocyanomethylamino compounds.

EXAMPLE 4

5 parts of finely powdered 1,5-dihydroxy-4,8-diamino-2 - (4'-methoxy) - phenylanthraquinone, 1.2 parts of paraformaldehyde, 2.6 parts of potassium cyanide and 17.4 parts of zinc chloride are introduced into a flask provided with a stirrer. A mixture of 100 parts by volume of glacial acetic acid and 4 drops of concentrated sulphuric acid is added while stirring and cooling the flask externally. The contents of the flask are heated to 50° C. within 20 to 30 minutes and then kept at that temperature for 8 hours while stirring. Working up is effected in the manner described in Example 1.

After drying, 6 parts of a dyestuff mixture containing monocyanomethylated, 1,5-dihydroxy - 4,8 - diamino-2-(4' - methoxy)-phenyl-anthraquinone are obtained which dyes polyethylene terephthalate pure blue shaded possessing very good fastness to light and excellent fastness to sublimation.

EXAMPLE 5

4.46 parts of finely powdered 1-aminoanthraquinone, 6.36 parts of benzaldehyde, 3.9 parts of potassium cyanide and 9.92 parts of zinc chloride are introduced into a flask provided with a stirrer. 100 parts of volume of glacial acetic acid mixed with 3 drops of sulphuric acid are added dropwise within one hour with stirring and external cooling. The temperature is then raised to 50° C. and the contents of the flask are kept at 50 to 60° C. for 10 hours. The batch is then cooled, diluted with 200 parts of water, stirred for a short time, filtered, and the filter residue is washed with warm water. 6.65 parts of a yellow-orange product having the following formula

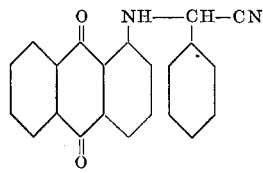

are obtained.

By using instead of 1-aminoanthraquinone corresponding amounts of 1-amino - 4 - hydroxyanthraquinone, 1,4-diaminoanthraquinone, 1,5 - diaminoanthraquinone, 1,4,5-8 - tetra - aminoanthraquinone, 1,4 - diamino - 2 - methoxyanthraquinone, 1,4 - di-(N-methyl)-amino - 5 - amino-8 - hydroxyanthraquinone or 4,8 - diaminoanthrarufin, but otherwise proceeding in the manner described above, the corresponding anthraquinone compounds are obtained in which the amino group or groups is/are wholly or in part replaced by the cyanophenylmethylamino group.

EXAMPLE 6

4.46 parts of finely powdered 1-aminoanthraquinone, 5.88 parts of cyclohexanone, 3.9 parts of potassium cyanide and 9.9 parts of zinc chloride are introduced into a flask provided with a stirrer. 100 parts of glacial acetic mixed with a few drops of sulphuric acid, are added dropwise within one hour while stirring and cooling. The temperature is then raised to 55° C. and the contents of the flask are kept at 55 to 60° C. for 10 hours. The batch is cooled, diluted with water, stirred for a short time, filtered, and the filter residue is washed with warm water. 6 parts of a yellow-orange product of the formula

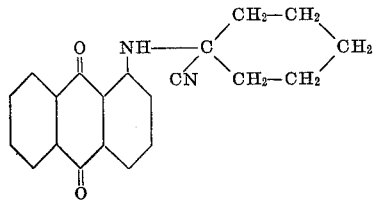

are obtained.

By using instead of 1 - aminoanthraquinone, corresponding amounts of 1 - amino - 4 - hydroxyanthraquinone, 1,4 - diaminoanthraquinone, 1,5 - diaminoanthraquinone, 1,4,5,8 - tetra - aminoanthraquinone or 4,8-diaminoanthrarufin, but otherwise proceeding in the manner described above, the corresponding anthraquinone compounds are obtained in which the amino group or groups are wholly or partly replaced by the N,1 - cyanocyclohexyl-(1)-amino groups.

By using instead of cyclohexanone equivalent amounts of cyclopentanone or methyl ethyl ketone, but otherwise proceeding in the manner described above, the corresponding anthraquinone compound is obtained in which the amino group is replaced by an N,1 - cyanocyclopentyl - (1) - amino group or a 1 - (α-cyano-α-methyl)-ethylamino group.

Dyeing procedure 1 part of the dyestuff obtained in the manner described in Example 1 is ground wet with 2 parts of a 50% aqueous solution of sulphite cellulose waste liquor, and the batch is dried.

The dyestuff preparation so obtained is mixed with 40 parts of a 10% aqueous solution of a condensation product obtained from octadecyl alcohol and 20 mols of ethylene oxide, and then 4 parts of a 40% acetic acid solution are added. A dyebath of 4,000 parts is prepared therefrom by dilution with water.

100 parts of cleaned polyethylene terephthalate fibrous material are entered into this bath at 50° C., the temperature is raised to 120 to 130° C. within half an hour and dyeing is carried out in a closed vessel for one hour at that temperature. The material is then well rinsed. A pure blue dyeing possessing excellent fastness to light and sublimation is obtained.

What is claimed:
1. A dihydroxydiaminoanthraquinone of the formula

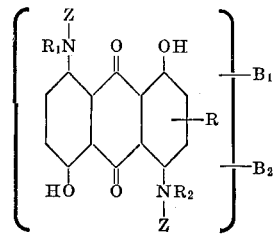

in which each of the symbols Z represents a member selected from the group consisting of hydrogen, and —$CH_2CN$, at least one of Z being a —$CH_2CN$ group, $B_2$ and $B_1$ each represents a member selected from the group consisting of alkyl, halogen and hydrogen; R represents an aryl radical which is unsubstituted or substituted by hydroxy, halogen, alkoxy, acetoxy or benzoyloxy and $R_1$ and $R_2$ each represents a member selected from the group consisting of a hydrogen atom, alkyl, hydroxy alkyl or acetoxy alkyl.

2. Dihydroxyaminoanthraquinones as claimed in claim 1 wherein the aryl radical R is a benzene radical which may be substituted in one of the positions ortho and para to the anthraquinone radical by at least one member selected from the group consisting of an acetoxy benzoyloxy, hydroxy and alkoxy group.

3. Cyanomethylated dihydroxydiaminoanthraquinones as claimed in claim 1 in which R represents a benzene radical and at least one of the substituents represented by $B_1$ and $B_2$ is a hydrogen atom.

4. The anthraquinone compound corresponding to the formula

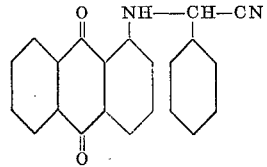

5. The anthraquinone compound corresponding to the formula

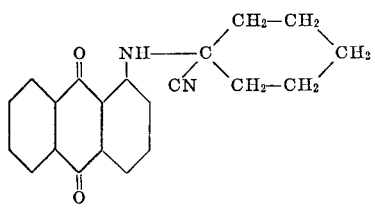

6. The anthraquinone compound corresponding to the formula

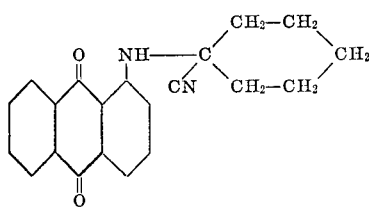

References Cited

UNITED STATES PATENTS 2,359,381 10/1944 Perkins et al. _____ 260—378
2,659,739 11/1953 Dickey _____ 260—380

OTHER REFERENCES

Houben-Weyl: Methods of Org. Chem. Band 8, p. 281, 1952.
Walther et al.: J. Prakt. Chem. 93, 1196, 1916.
Dimroth et al.: Chem. Ber. 98, 3902 (1965).

LORRAINE A. WEINBERGER, Primary Examiner

R. GERSTL, Assistant Examiner

U.S. Cl. X.R.

8—39, 40; 260—329.2, 340.5, 345.2, 346.2, 373, 376, 379, 380

PO-1050
(5/69)

UNITED STATES PATENT OFFICE
CERTIFICATE OF CORRECTION

Patent No. 3,636,006          Dated January 18, 1972

Inventor(s) JEAN-FREDERICK GUYE-VUILLEME ET AL

It is certified that error appears in the above-identified patent and that said Letters Patent are hereby corrected as shown below:

Column 6, line 55 should read --- A dihydroxyaminoanthra-quinone as claimed in claim ---.

Column 6, line 59, after "acetoxy" insert --- , ---.

Column 6, line 61 should read --- A cyanomethylated di-hydroxydiaminoanthraquinone ---.

Signed and sealed this 11th day of July 1972.

(SEAL)
Attest:

EDWARD M. FLETCHER, JR.
Attesting Officer

ROBERT GOTTSCHALK
Commissioner of Patents